Aug. 27, 1968  L. P. CROSET  3,398,602
TORSIONAL VIBRATION DAMPERS
Filed May 26, 1966

INVENTOR:
Louis Paul Croset
BY
ATTORNEY

3,398,602
TORSIONAL VIBRATION DAMPERS
Louis Paul Croset, 23 Gernhill Ave.,
Huddersfield, Yorkshire, England
Filed May 26, 1966, Ser. No. 553,139
Claims priority, application Great Britain, May 27, 1965,
22,490/65
10 Claims. (Cl. 74—574)

ABSTRACT OF THE DISCLOSURE

A torsional vibration damper in which a disc is fixedly attachable as a collar flange to a shaft. A cylindrical inertial casing is supported via bearings about the disc. Between the disc and the interior of the casing is a fluid film. The cylindrical casing has an annular cover which is removable to enable accurate machining of its interior. The contact between this cover and the rest of the casing is made fluid tight by a seal. The bearings are of hard, non-metallic material. They sit in recesses in the cylindrical casing and protrude a predetermined number of thousandths of an inch inwardly to fix the fluid gap between the disc and the casing interior.

---

This invention concerns torsional vibration dampers and relates more particularly to such dampers of the type comprising concentrically mounted driving and driven, fluid-coupled members of which the driven member constitutes a flywheel or inertia member acting through the coupling fluid to damp torsional vibrational movements of the driving member.

In many torsional vibration damper constructions currently in use, the coupling fluid is a viscous fluid, often a silicone oil, and the driving and driven members are arranged in close-spaced relation with a fluid shear film between them for transmitting the driving and damping forces between the two members. The close spacing necessary to establish the shear film, however, requires an accuracy of manufacture and assembly of the damper which is not simple to attain, whilst the sealing of the viscous fluid in the damper is usually accomplished either by welding operations carried out after the assembly has been completed, or by measures such as peening or rolling a peripheral edge of the damper casing over another portion of the casing. Welding operations will readily be understood, however, to be destructive of the accuracy of manufacture and assembly which has by that stage been employed to establish the close spacing of the driving and driven members of the damper, while peening and rolling operations demand that the casing be made of appropriately malleable materials.

According to the present invention, a torsional vibration damper has a driving member comprising a hub portion for securing to a driving shaft and an annular disc portion extending radially outwardly from the hub portion, a driven member comprising a cylindrical casing having a radially inwardly directed, annular end wall integral with a cylindrical outer wall and a plane annular end cover bolted to the other end of said cylindrical wall for closing said casing and defining therein a closed annular chamber having surfaces in close-spaced, fluid driving relation with corresponding surfaces of said annular disc portion, there being a sealing ring interposed between said end cover and said other end of said cylindrical wall, a sealing ring between said hub portion and the inner periphery of said cylindrical casing towards each axial end region of said hub portion and said inner periphery, and a non-metallic bearing ring between said driving member and said cylindrical casing immediately adjoining each side of the annular disc of said driving member, said bearing rings protruding from both axially and radially directed surfaces of said cylindrical casing. By virtue of the damper construction provided by the invention, the driven member or flywheel is the outer one of the two rotatable components of the damper and is of simple, two-part configuration with all the chamber surfaces readily accessible for accurate grinding to close tolerance dimensions, while the disc portion of the driving member is of similarly simple geometrical shape and again readily machined to close tolerances. Accurate datum surfaces are therefore easily established on these two members and make it possible in a very simple way to establish the requisite close spacing of the driving member disc portion with the fluid chamber walls merely by accurately sizing and fitting the bearing rings to accurately establish the amount by which they stand proud of said axial and radial surfaces and thus to create the appropriate clearances between said disc portion and said walls.

In view of the facility which the invention provides for accuracy in manufacture and assembly, and since in the assembled condition of the damper the bearing rings themselves prevent metallic contact between the driving and driven members, the latter may conveniently be made of cast iron, which is relatively inexpensive and easily worked, while the spacing between said members may be significantly reduced as compared with that employed in conventional dampers due to the fact that no allowance need be made for possible distortion of the casing subsequently to assembly and such as not infrequently occurs where peening or welding operations to seal the casing are required after assembly has been otherwise completed.

Preferably, the coupling fluid used in the damper proposed by the invention is a viscous silicone fluid having a viscosity of the order of 60,000 centistokes at 100° C., but the invention envisages the use of silicone and other viscous fluids having viscosities as high as 350,000 centistokes at 100° C. Thus, for example, when the damper is required to be a tuned damper, a silicone oil having a viscosity at the high end of the indicated range is employed and the working clearance between the driving and the driven members is made of the order of 0.020 inch to 0.040 inch.

The bearing rings may be arranged between the hub portion of the driving member and the inner periphery of the cylindrical casing, with on bearing ring immediately adjoining each side of the annular disc portion of the driving member; or alternatively they may be arranged at the outer diameter of said annular disc portion and on each side thereof.

The invention will be described further by way of example with reference to the accompanying drawings, in which.

Figure 1:
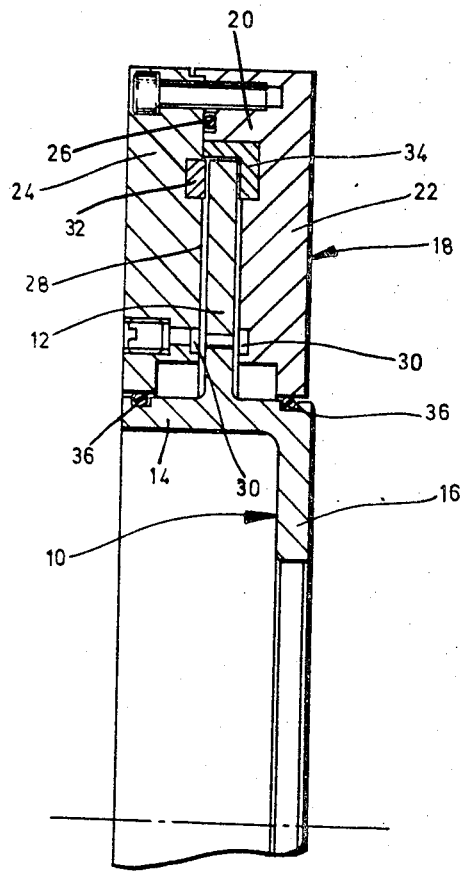
FIG. 1 is an axial section through one half of a torsional vibration damper embodying the invention.

The torsional vibration damper shown in FIG. 1 of the drawings has a driving member generally designated 10 and made of cast iron. The driving member 10 comprises a plane annular disc 12 extending radially outwardly from a central region of a cylindrical hub 14 which at one end is provided with a radially inwardly directed annular flange 16 for securing to a driving shaft (not shown). A driven or inertia member generally designated 18 is also made of cast iron and is of two part construction, having a first part 20 comprising an outer cylindrical wall formed integrally at one of its ends with a radially inwardly directed, annular end wall 22, and a second part in the shape of a plane annular end cover 24 which is adapted to be bolted to said first part, with a first sealing ring 26 interposed between the two to seal the interface between the cover 24 and the cooperating end of the cylindrical wall 20. Internally, therefore, there is defined within the driven member, an annular chamber 28, the axial width of which is arranged to be just slightly greater than that of the driving disc 12, and at a radially inner region of this annular chamber, the end cover 24 and an opposed region of the annular end wall 22 of the driven member are formed with annular grooves 30 to act as fluid reservoirs for a silicone oil employed as a coupling fluid in the damper. At a radially outer region, a recess of the end cover 24 of the driven member is fitted with an annular non-metallic bearing ring 32 which projects both radially from and axially into the fluid chamber 28 while a second and L-section bearing ring 34 is fitted at a corresponding position in a recess at the junction between the radial wall and annular end wall of the cylindrical casing component.

The damper is assembled by passing the cylindrical casing component 20, 22 over the cylindrical hub 14 of the driving member at one side of the annular driving disc 12, with the bearing ring 34 in that component axially overlying the periphery of the disc and thereafter fitting the end cover 24 of the driven member over the hub 14 at the opposite side of the driving disc 12, the cover then being bolted to the end face of the cylindrical wall 20 of the driven member. Since both the component parts of the driven member are easily accessible and completely open to any required machining operation such as grinding, all the radial and axial surfaces of the fluid chamber 28 and of the driving disc 12 can be given an extremely fine finish to very small dimensional tolerances and thus provide accurate datum surfaces for the fitting of the bearing rings 32 and 34. In consequence, it is then possible so to dimension the latter that, when the damper is assembled, the bearing rings themselves automatically establish the required close spacing between the driving disc 12 and the interior walls of the fluid chamber 28. Furthermore, because of the accuracy with which machining can be carried out, that spacing can readily be made very much less than is usual in dampers, more especially when made of such relatively inexpensive material as cast iron, and clearances of the order to seven to nine thousandths of one inch are employed in the invention. The bearings rings 32 and 34 may be either of a fibrous material such as the asbestos and filler compositions commonly employed, for example, in vehicle brake linings, or they may be of a suitable synthetic resin material such as hard nylon, which has the additional advantage that the rings may then be very accurately moulded to the required size without the need for any further machining or other sizing operation. The bearing rings 32 and 34 are arranged to project axially from their radial chamber walls by about two to four thousandths of an inch, and to project radially from the fluid chamber by some three to five thousandths of an inch. Axially outwardly of each bearing ring, a second fluid sealing ring 36 is interposed between the inner periphery of the driven member 18 and the cylindrical hub 14 to seal within the chamber 28, the silicone oil used as the coupling fluid and to exclude foreign matter attempting to penetrate between the facing surfaces of the driving and driven members.

Figure 2:
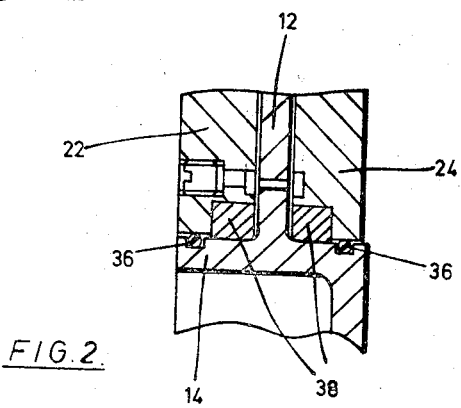
FIG. 2 is a sectional detail of a modification of the invention.

Instead of providing bearing rings 32 and 34 which locate the outer periphery of the driving disc 12, the damper may be modified as shown in FIG. 2, by the provision of bearing rings 38 arranged one on each side of the disc 12, in recesses at the inner peripheries of the casing components 22 and 24, and arranged to locate and run on the hub 14. The bearings 38 project radially and axially from their mounting positions in the casing 18 to establish the proper spacings of the disc 12 from the walls of the fluid chamber 28.

It will be appreciated that, by reason of the reduced spacing which the invention permits between the driving disc 12 and the internal walls of the fluid chamber 28, the body of silicone oil which lies between the two more closely resembles a film than is the case in existing dampers with wider spacing, and that therefore the fluid shear effect which is believed to be largely responsible for the damping produced is accordingly the more pronounced, giving greater efficiency of damper operation. A further substantial contribution to operating efficiency also results from the fine internal surface finish already referred to above.

It may be noted that the invention readily lends itself to damper constructions using a plurality of driving discs and spacers on the driving member, by the simple expedient of making the fluid chamber of increased axial width by increasing the length of the cylindrical wall of the driven member.

I claim:

1. A torsional vibration damper comprising a driving member including a hub portion for securing to a driving shaft and an annular disc portion extending radially outwardly from the hub portion, a driven member of cast iron comprising a cylindrical casing having a radially inwardly directed, annular end wall integral with one end of a cylindrical outer wall and a plain annular end cover bolted to the other end of said cylindrical wall for closing said casing and defining therein a closed annular chamber having surfaces in close-spaced, fluid driving relation with corresponding surfaces of said annular disc portion, damping fluid in said annular chamber, there being a first sealing ring interposed between said end cover and said other end of said cylindrical wall, a second sealing ring between said hub portion and the inner periphery of said cylindrical casing towards each axial end region of said hub portion and said inner periphery, said cylindrical casing having annular recesses in said annular chamber immediately adjoining each side of the annular disc of said driving member, and hard non-metallic bearing rings fitted in said recesses, said bearing rings projecting slightly from both axially and radially directed surfaces of said cylindrical casing toward said annular disc.

2. A torsional vibration damper as set forth in claim 1, wherein the bearing rings are mounted at the inner periphery of the cylindrical casing.

3. A torsional vibration damper as set forth in claim 1, wherein the bearing rings are mounted towards the outer periphery of the cylindrical casing.

4. A torsional vibration damper as set forth in claim 3, in which the bearing ring mounted in the casing cover is a plane annular ring, and the bearing ring mounted in the other part of the casing is of L-section.

5. A torsional vibration damper as set forth in claim 1, wherein the bearing rings are made of an asbestos fibre and filler composition.

6. A torsional vibration damper as set forth in claim 1, wherein the bearing rings are made of moulded nylon.

7. A torsional vibration damper as set forth in claim 1, wherein the damping fluid is a silicone oil.

8. A torsional vibration damper as set forth in claim 7, wherein the viscosity of the silicone fluid is in the range 60,000 to 350,000 centistokes at 100° C.

9. A torsional vibration damper as claimed in claim 8, wherein the spacing of the fluid drive surfaces of the annular disc from the co-operating surfaces of the driven cylindrical casing is in the range from five thousandths to forty thousandths of one inch in dampers respectively of diameters lying between eight inches and ninety inches and respectively employing the lower viscosity and the higher viscosity fluids.

10. A torsional vibration damper as claimed in claim 1, said bearing rings being mounted towards the outer periphery of the cylindrical casing, the bearing ring mounted in the casing cover being a plane annular ring, the bearing ring mounted in the other part of the casing being of L- section, said bearing rings being made of material chosen from the group consisting of asbestos fibre and filler compositions and moulded nylon, said driven member being made of cast iron, said damping fluid being a silicone oil, the viscosity of the silicone oil being in the range 60,000 to 350,000 centistokes at 100° C., the spacing of the fluid drive surfaces of the annular disc from the co-operating surfaces of the driven cylindrical casing being in the range from five thousandths to forty thousandths of one inch in dampers respectively of diameters lying between eight inches and ninety inches and respectively employing the lower viscosity and the higher viscosity fluids.

References Cited

UNITED STATES PATENTS

| 2,824,467 | 2/1958 | O'Connor | 74—574 |
| 3,234,817 | 2/1966 | Williamson | 74—574 |
| 3,262,334 | 7/1966 | Edwards | 74—574 |
| 3,303,719 | 2/1967 | Beier | 74—574 |

FRED C. MATTERN, JR., *Primary Examiner.*

F. D. SHOEMAKER, *Assistant Examiner.*